Sept. 20, 1932.   E. F. NORTHRUP   1,878,532
INDUCTOR TYPE FURNACE
Filed Oct. 4, 1928   2 Sheets-Sheet 1
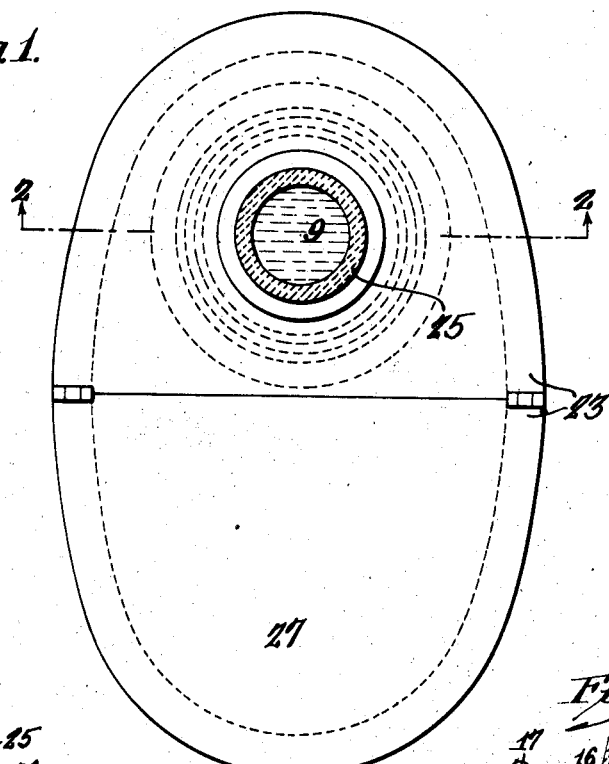
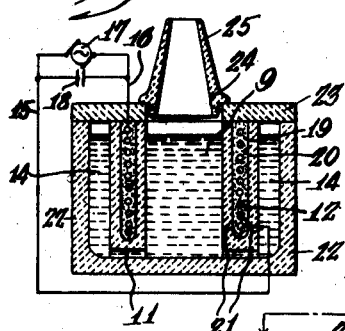
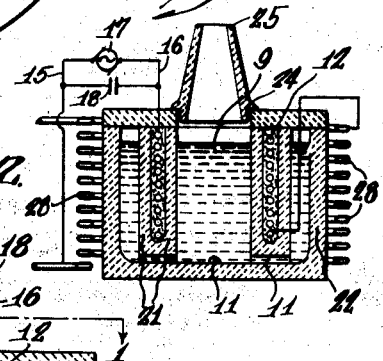
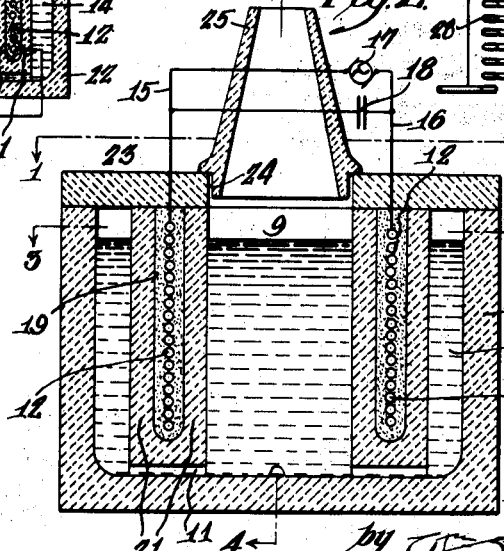
Inventor:
Edwin F. Northrup.
by ... Attorney.

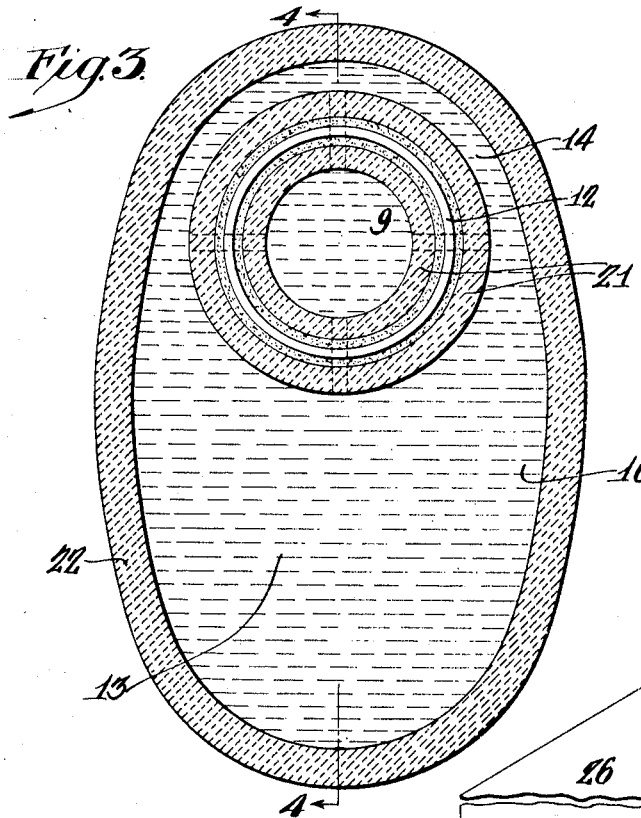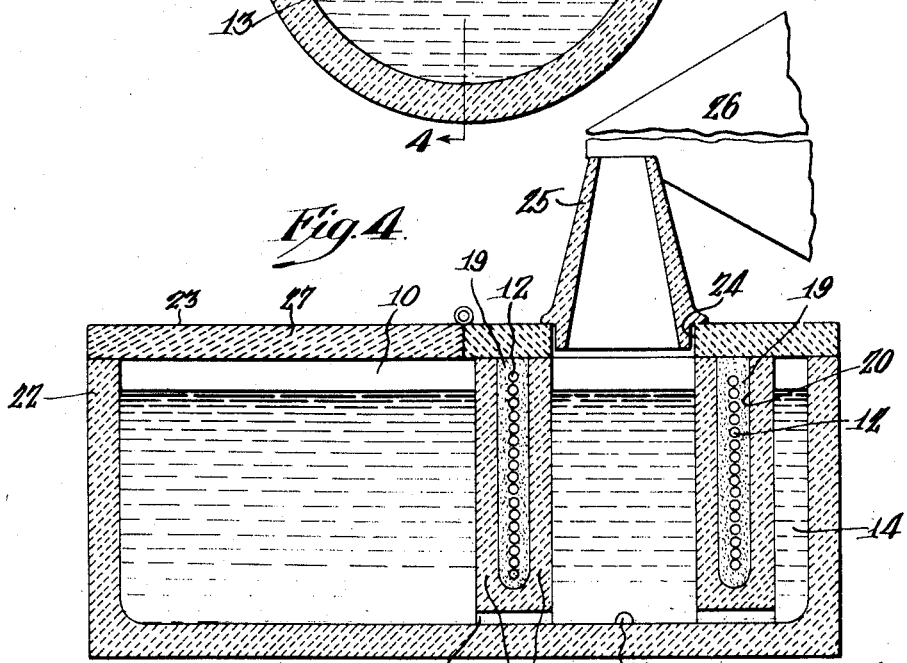

Patented Sept. 20, 1932

1,878,532

UNITED STATES PATENT OFFICE

EDWIN FITCH NORTHRUP, OF PRINCETON, NEW JERSEY, ASSIGNOR TO AJAX ELECTROTHERMIC CORPORATION, OF TRENTON, NEW JERSEY, A CORPORATION OF NEW JERSEY

INDUCTOR TYPE FURNACE

Application filed October 4, 1928. Serial No. 310,381.

My invention relates to the vaporization of metals for the purpose of subsequent concentration to secure extremely fine subdivision or greater purity of the metals or both.

A further purpose is to separate the melting and vaporizing parts of a vaporizing furnace.

A further purpose is to utilize the same heating means for melting the metal in one compartment and for vaporizing it from another compartment of effectively the same furnace.

A further purpose is to surround or partly surround a vaporizing chamber by a melting chamber and heat both by intermediate electrical and preferably inductor furnace means.

A further purpose is to utilize the coreless type of inductor furnace for vaporizing metal upon the inside of the inductor and for melting metal on the outside, the melted metal passing from one chamber to the other to take the place of the metal vaporized.

A further purpose is to make a melting chamber a continuous feeder for a vaporizing chamber.

A further purpose is to use combined resistance and induction heating means for a coil surrounding one pool and surrounded by another.

A further purpose is to use an outside coil surrounding two pools for the purpose of heating the outer pool and at the same time assisting the return magnetic circuit of an inductor coil surrounding one of these pools and surrounded by the other.

Further purposes will appear in the specification and in the claims.

My invention relates both to the methods involved and to apparatus by which the methods may be carried out.

Vaporization of metals is commonly practiced for purposes of refinement or merely for fine subdivision. It is applied to many different metals. One of the best examples of this is in the zinc art in which the zinc is vaporized within a furnace and is subsequently condensed in the form of impalpable zinc powder. Though the invention is applicable to the volatilization of a great many different metals zinc vaporization forms so excellent an example that in the main it will be used as the basis of illustration.

I have preferred to illustrate the invention by one main form only, with variation in the heating coils used, among the number of forms in which the invention might appear, selecting one which is practical, efficient and reliable, but which has been selected chiefly because it illustrates to the best advantage the principles involved.

Figure 1 is a sectional top plan view of the selected embodiment of my invention, taken upon line 1—1 of Figure 2.

Figure 2 is a section of Figure 1 taken upon line 2—2.

Figures 3 and 4 are sections of Figure 2 taken upon lines 3—3 and 4—4, respectively.

Figures 5 and 6 are sections corresponding to Figure 2 but showing slight modifications.

In the drawings similar numerals indicate like parts.

My furnace comprises two contiguous compartments, a vaporizing compartment 9 and a melting compartment 10, which communicate, preferably near the bottom of the compartments by any passage or passages 11.

These compartments are not only contiguous for the purpose of permitting molten metal to flow from the melting compartment 10 to the vaporizing compartment 9 to take the place of metal vaporized, but for the further purpose of permitting the same heating coil 12, preferably an inductor coil, surrounding the vaporizing compartment to heat both compartments, preferably by setting up a flow of induced current in the melting compartment 10 also. For the best form of my invention the melting compartment must either completely surround the vaporizing compartment or, if it but partly surround this compartment, a path must be provided for the flow of electric current through the remainder of the distance around the vaporizing compartment. Much the most desirable form and the cheapest, most convenient and most compact form is to completely surround the vaporizing compartment and the coil by molten metal. I have, therefore, illustrated this form and show an inductor as the heating means.

The vaporizing compartment is preferably circular and the melting compartment comprises a main pool 13 and a communicating channel-like portion 14 which, with the body of the pool completely surrounds the vaporizing compartment.

The inductor coil 12 is supplied with alternating electric current preferably of high frequency by leads 15 and 16 from any suitable source of current 17 corrected for power factor if needed by condensers 18.

The turns of the coil are insulated between in any suitable manner, as by air insulation to which may be added a suitable spacing insulation such as refractory 19. This may, for example, be sand which will stand the temperature to which the metal must be raised during vaporization. With zinc this temperature would be less than 1000° C.

The coil with or without any special insulation is shown as located within an annular groove 20 in a refractory cylinder 21 which in turn rests within a refractory dish 22 covered at 23 so as to keep out the air.

The cover 23 should be air tight where it engages with the inner portion of the refractory 14 about the vaporizing chamber. The cover is apertured at 24 so as to provide for a preferably funnel shaped dome 25 by which the vaporized products are led to any suitable condenser 26. The dome is made of refractory material.

The cover of the main pool portion of the melting chamber is arranged so as to permit introduction of solid metal within the pool. In the illustration this has been done by hinging the flap 27 so that it may be lifted for the insertion of the metal.

In Figure 6 a supplemental inductor coil 28 is shown as surrounding the melting pool and as arranged in series with the inner inductor 12. The outer inductor may be artificially cooled if desired and is therefore illustrated as of hollow water-cooled type. The inner inductor not only need not be water-cooled but there is an advantage in not water-cooling it so long as the temperature to which it will be raised is well within the limits of temperature to which the metal of the coil is suited. The only advantage of liquid cooling it is to keep the temperature down within safe limits. For vaporization of zinc this is not needed as an inductor of nickel or even of copper would stand the temperature well. There are many well known alloys which would also serve here.

In operation current is supplied to the inductor coil from a suitable source, preferably high frequency. As will be seen, my invention is in no way dependent upon the character of the current supplied except in so far as it must be capable of supplying the heat, preferably by induction heating currents, within the metal in the vaporizing chamber within the coil, and the metal in the melting chamber outside the coil, and must of course perform this function economically to take its part in a commercial operation. The coil may be of nichrome, for example, in order to stand the fairly high temperatures if any considerable volume of heat is to be generated in it and the conductors be solid, or of nickel or even copper if the temperature to which the intended current will raise the conductor be within the limits below copper melting.

In considering the temperature of the coil it must be remembered that though the coil is adjacent to the relatively high temperature of vaporization of the metal which is being boiled, it is relatively cooled on the outside since it is there surrounded by molten metal whose temperature of melting is very much lower than the volatilization point. Zinc, for example, melts at less than half its temperature for vaporization.

It will be noted that substantially all the heat generated within the inductor is transmitted through the furnace walls to the pools inside and outside the coil, as substantially all of conduction, convection and radiation of heat must take place through these walls. Very little heat can escape through the upper and lower parts of the walls. As a result a very high efficiency can be obtained.

As a further result of this fact this form of furnace lends itself to the use of a heating element emphasizing the resistive heating effect rather than the induction effect. It heats the pools to less advantage than the inductor form, but nevertheless can be made to heat them quite effectively. When wound as a spiral it necessarily acts as an inductor coil also. I have shown such a furnace in Figure 5. In this it is desirable that the walls between the two pools be of as good heat conductive material as can be secured with proper electrical insulation and resistance to destruction by heat.

Because of the capability of use of my invention with a resistor heating element, as distinguished from an inductor, I claim this subject matter broadly enough to cover both forms.

Initially its is desirable to start upon molten metal poured into the outer pool and flowing into the inner pool. Because the pools and coil, or coils, are so designed as to raise metal within the inner pool to higher temperature than that in the outer pool, the metal within the inner pool will heat up rapidly and vaporize.

As metal is vaporized within the inner chamber, an approximately equal amount of metal from the outer chamber passes through the channels 11 and takes its place. At intervals additional unmelted metal is inserted in the outer pool to keep up the level.

I believe myself to be the first to provide any electrical means for melting metal and for vaporizing it in different chambers, with communication between the chambers, and that I am the first to use the same electrical means for both of these functions.

I believe that I am the first to set up induction currents in molten metal both outside and inside the same coil independently of the purpose for which this is intended, and accordingly propose covering this subject matter broadly.

Even where advantage is intended to be taken primarily of the induction effect of the coil, the heat generated in it can be transmitted to the metals about it giving combined inductive and resistance heating in the inductor furnace also. In the design of a furnace care will, of course, be taken to make use of the resistance chiefly or alone, the inductance with but very slight resistance heating, or the inductance with a coil intended to reach a high temperature and assist with resistance heating, according to the needs of the individual equipment, the metal treated and the preference of the designer.

It will be noted that with the inductor heating unit the magnetic flux passing through the inductor is utilized to set up electric currents in the inner pool while the return magnetic flux from the inductor outside of the coil is utilized to set up electric currents in the surrounding melting pool; and that the flow of electric current through the surrounding pool is effective to restrict the stray magnetic flux so that there will be substantially no stray field about my furnace.

It will be evident that my method of melting and vaporizing makes use of the magnetic flux within the inductor coil to supply the additional heat required for vaporization, and at the same time makes use of the return flux outside of the inductor coil to supply the required heat within the melting chamber. The flow of current through the metal outside of the inductor coil is effective also to shield the space outside of this current path from stray lines of magnetic flux which might otherwise return at a greater distance from the inductor than the path of induced current.

The ring containing the inductor may be made removable from the container defining the outer pool.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of melting and vaporizing metals, which consists in utilizing the flux from an alternating current furnace inductor to set up lines of force inside the inductor to cause current flow in a vaporizing chamber to vaporize molten metal and the flux outside the inductor to set up heating currents within a melting chamber, in restraining fluid communication between the chambers at the top where vaporization takes place and in providing fluid communication between the two chambers below the vaporizing surface whereby the metal from the melting chamber flows in to take the place of the metal vaporized from the vaporizing chamber.

2. The method of electric heating and vaporizing metal by an inductor coil which consists in using the magnetic flux within the coil to heat and vaporize a part of the metal, in using the return magnetic flux from an inductor coil to heat and melt the remainder of the metal and in maintaining a balance between the vaporizing and melting functions by providing some communication between the parts of the metal.

3. In a metal vaporizing furnace, walls forming a vaporizing chamber, walls forming a melting chamber enclosing the vaporizing chamber, a condenser with which the vaporizing chamber is connected and electric heating means common to both chambers and located between them.

4. In a vaporizing furnace, walls forming a pair of contiguous chambers for melting and vaporizing metal, respectively, having fluid communication between the lower parts of the chambers, a condenser with which the vaporizing chamber is connected in combination with an electrical heating element within the space between them and adapted to heat the contents of both chambers.

5. In a vaporizing furnace, walls forming a cylindrical chamber for holding a content to be vaporized, walls forming a surrounding melting chamber communicating with the vaporizing chamber to permit the melt to flow from the melting chamber to the lower part of the vaporizing chamber, a condenser with which the vaporizing chamber is connected and electrical heating means located in the space between the two chambers and effective to heat the melt in both chambers.

6. In a vaporizing furnace, walls forming a cylindrical chamber for holding a content to be vaporized, walls forming a surrounding melting chamber communicating with the vaporizing chamber to permit the melt to flow from the melting chamber to the lower part of the vaporizing chamber, a condenser with which the vaporizing chamber is connected and an inductor coil located in the space between the two chambers and effective to inductively heat the melt in both chambers.

7. In a vaporizing furnace, walls forming a cylindrical chamber for holding a content to be vaporized, walls forming a surrounding melting chamber communicating with the vaporizing chamber to permit the melt to flow from the melting chamber to the lower part of the vaporizing chamber, a condenser with which the vaporizing chamber is connected and a combined inductor and resistance heating coil located in the space between the two chambers and effective to heat the melt in both chambers.

8. In a vaporizing furnace for metals, an inductor coil, walls interior thereto defining a pool from which metal is to be vaporized, connections for leading off the vapor, a condenser for the vapor to which it is led by connections, walls outside of the inductor forming a holder for molten metal within which metal is adapted to be melted and from which the molten metal is free to pass to the vaporizing pool, and high frequency current supply for the inductor.

EDWIN FITCH NORTHRUP.